(12) United States Patent
Yang et al.

(10) Patent No.: US 7,860,783 B2
(45) Date of Patent: Dec. 28, 2010

(54) ACCOUNT-LEVEL FRAUD DETECTOR AND ASSOCIATED METHODS

(75) Inventors: Linyu Yang, San Diego, CA (US); Joseph P. Milana, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 518 days.

(21) Appl. No.: 11/389,983

(22) Filed: Mar. 27, 2006

(65) Prior Publication Data
US 2007/0106580 A1 May 10, 2007

Related U.S. Application Data

(60) Provisional application No. 60/734,735, filed on Nov. 7, 2005.

(51) Int. Cl.
*G06Q 40/00* (2006.01)

(52) U.S. Cl. .................. 705/38; 705/35; 705/36 R; 705/37; 705/39; 705/40; 705/41; 705/42; 705/53; 705/44; 705/45; 235/379; 235/378

(58) Field of Classification Search .................. 705/35; 235/379
See application file for complete search history.

(56) References Cited

U.S. PATENT DOCUMENTS

| | | | |
|---|---|---|---|
| 4,643,453 A | 2/1987 | Shapiro et al. | |
| 6,094,643 A | 7/2000 | Anderson et al. | |
| 6,597,775 B2 | 7/2003 | Lawyer et al. | |
| 6,839,682 B1 | 1/2005 | Blume et al. | |
| 6,873,979 B2 | 3/2005 | Fishman et al. | |
| 7,089,592 B2 | 8/2006 | Adjaoute | |
| 2002/0029194 A1 | 3/2002 | Lewis | |
| 2002/0194119 A1 | 12/2002 | Wright et al. | |
| 2005/0182712 A1 | 8/2005 | Angell | |

OTHER PUBLICATIONS

Authorized Officer Shian Luong, Communication In Cases For Which No Other Form Is Applicable (transmitting a Corrected International Search Report (PCT/ISA/210) and Written Opinion of the International Searching Authority (PCT/ISA/237)), Application No. PCT/US06/43284, mailed Mar. 25, 2009, 6 pages.
Authorized Office Nora Lindner, International Preliminary Report on Patentability, PCT/US06/43284, mailed Apr. 16, 2009, 5 pages.
International Search Report & Written Opinion for Application No. PCT/US06/43284, dated Aug. 25, 2008, 9 pages.

*Primary Examiner*—Kirsten S Apple
(74) *Attorney, Agent, or Firm*—Fish & Richardson P.C.

(57) ABSTRACT

A method of generating a model for performing account-level fraud detection is disclosed, and includes obtaining a plurality of candidate rules for referrals of financial transactions, calculating a savings density for each of the plurality of rules, selecting a rule from the plurality of rules having the maximum savings density, iteratively rebalancing savings densities for the remaining rules of the plurality of rules and selecting a next rule until a volume constraint is satisfied, and applying the selected rules to one or more financial transactions.

15 Claims, 11 Drawing Sheets

| July 1 | July 2 | | July 3 | | July 4 |
|---|---|---|---|---|---|
| ($200) | ($1000) | ($500) | ($50) | ($200) | ($100) |

Figure 3

ACCOUNT-LEVEL FRAUD DETECTOR AND ASSOCIATED METHODS

CROSS-REFERENCE TO RELATED APPLICATIONS

This application claims priority to U.S. Application Ser. No. 60/734,735, filed on Nov. 7, 2005, the contents of which are hereby incorporated by reference in their entirety.

TECHNICAL FIELD

This disclosure relates generally to computer-based mechanisms for identifying possible fraudulent transactions, and more particularly to techniques for identifying credit card or similar fraud based on account-level factors rather than simply transaction-level factors.

BACKGROUND

Although banks and other financial institutions have gained control of credit card fraud over the last decade using tools such as the Fair Isaac Falcon fraud scoring system, fraudsters continue to evolve, and they see credit and debit cards as rich targets. Among other approaches, financial institutions use various behavior monitoring tracking techniques to identify out-of-the-ordinary behavior as potentially fraudulent. For example, where a particular customer typically does not purchase goods of a particular type, and then makes multiple purchases of such goods, the tracking system may raise a red flag, as it is possible that the customer's card has been stolen. Also, certain types of goods such as jewelry and electronics, and other goods that are easily transferable into cash, may also tend to signal a fraudulent transaction. Multiple purchases in a short time period may do the same, as may purchases far from a customer's home.

Factors like these may be combined into a fraud score, which is typically a numeric value or values that represent a weighting of the various factors that suggest that a transaction is or is not fraudulent. That fraud score may then be used by a financial institution to determine whether to take action. Typically, such action involves a "referral," which often produces a rejection of a transaction and follow-up by the financial institution's customer service department. For example, a customer may be contacted telephonically by a customer service representative at a telephone number associated with the account, to confirm whether the customer is aware of the transaction. Other follow-up measures may also be taken.

There are costs associated with "false negatives," i.e., failures to identify real fraud, and "false positives," i.e., referrals when no fraud has occurred. The costs of false negatives are fairly obvious: the financial institution may have to cover the cost of some or all of the transaction(s) for the customer. The costs of false positives include the cost of the customer service operation and the cost of dissatisfied customers who may have to spend time clearing up the confusion and also may have their transaction(s) denied. When multiplied across millions or billions of transactions, such costs can be enormous. Thus, a fraud detection system or method should generally identify attempted fraud when it does occur, and not identify activity as fraud when it is legitimate activity.

The simplest constraint in determining what transactions to refer is referral volume. Specifically, a corporation's ability to process referrals for fraud may serve as a limit on the number of referrals that a fraud detection system may make. Thus, systems may permit flexibility in setting the standard for which case to refer. In one form, an "optimized" form of a Falcon score (converting the score to the probability of fraud), which estimates the expected net savings of a referral, has been used. Likewise, a set of optimal rules has shifted the inquiry from a score-based approach to a more standardized approach, in attempting to optimize value given a particular volume constraint. Such rules provide easier interpretation by users of the system, which may lead to greater acceptance of a fraud detection technique. Such rule optimization has also been extended to include multiple constraints and an assessment of potential attrition effects of false positives. Yet another system uses a referral score that includes discount factors of expected recovery rates for different fraud transaction types. Such techniques are generally complementary to the Falcon score approach, and increase its effectiveness.

For each of these approaches, the analysis, and hence the optimization, was performed at the transaction level. Transaction-level formulations can be solved using established optimization techniques. Referrals are transaction-level actions, but their impact is felt by the consumer, and so fraud strategies are typically implemented at the account level. In contrast, the account-level problem involves non-linear considerations, and is thus more complicated.

SUMMARY

In general, this document discusses a system and method for analyzing activities for fraud at the account level. In one implementation, a method of generating a model for performing account-level fraud detection is disclosed. The method comprises obtaining a plurality of candidate rules for referrals of financial transactions, determining a value density for each of the plurality of rules, selecting a rule from the plurality of rules based on the determined value densities, iteratively rebalancing value densities for the remaining rules of the plurality of candidate rules, and selecting a next rule until a volume constraint is satisfied, to obtain a set of rules for application to one or more financial transaction.

The plurality of candidate rules may be referral rules that trigger an account referral. Also, the plurality of candidate rules may be derived from historical transactional data. Each of the candidate rules may also be mutually disjoint, and the value density for each of the plurality of rules may be calculated for historical transactional data. The selection of the set of rules may also be constrained by a plurality of constraints, such as an overall fraud detection rate being kept above a prescribed fraction, or that a potential attrition of legitimate accounts be kept below an allowed level. Additionally, the plurality of candidate rules may include a rule corresponding to a Falcon score.

In another implementation a method of analyzing information relating to account-level fraud detection is disclosed. The method comprises obtaining a plurality of candidate rules for referrals of financial transactions, applying a sequential knapsack operation to the plurality of candidate rules, and generating and storing a rule set to be applied to financial transactions from the application of the sequential knapsack operation. Savings associated with the candidate rules may also be computed, and the savings may comprise account-level metrics. In addition the sequential knapsack operation may be constrained by a maximum preferred referral volume. Moreover, the method may include applying the rule set to a financial transaction and generating an indicator that controls handling of the transaction.

In yet another aspect, a recordable media having instructions recorded thereon is disclosed. When executed, the instructions may apply a sequential knapsack operation to a plurality of candidate transaction exception rules and generate and store a rule set to be applied to financial transactions from the application of the sequential knapsack operation. Instructions may also be provided that when executed produce a signal for controlling how a financial transaction is handled, and that apply the sequential knapsack algorithm to data stored on the media representing historical financial transactions. The rule sets may also comprise a selected plurality of transaction handling rules to be applied to future transactions.

In another aspect a fraud detection system is provided that includes a database containing historical financial transaction-related data and a means for generating one or more financial transaction rules for application to futures transactions, using the historical financial transaction-related data. And in another aspect, a fraud detection system is disclosed that includes an interface configured to receive financial transaction-related data, a server to produce one or more fraud scores relating to a proposed financial transaction under observation for fraud-related activity, memory storing a plurality of fraud detection rules derived from historical financial data and optimized for savings at an account level with a constraint on a permissible exception creation rate by the rules, and a rules engine to apply the plurality of fraud detection rules to data relating to financial transactions received through the interface.

In some implementations, one of the plurality of fraud detection rules may correspond to the fraud score, and one of the rules may correspond to a transaction value. The fraud detection rules may also be optimized using a sequential knapsack operation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a diagram showing a flow of card authorizations.

Like reference symbols in the various drawings indicate like elements.

DETAILED DESCRIPTION

Figure 1:
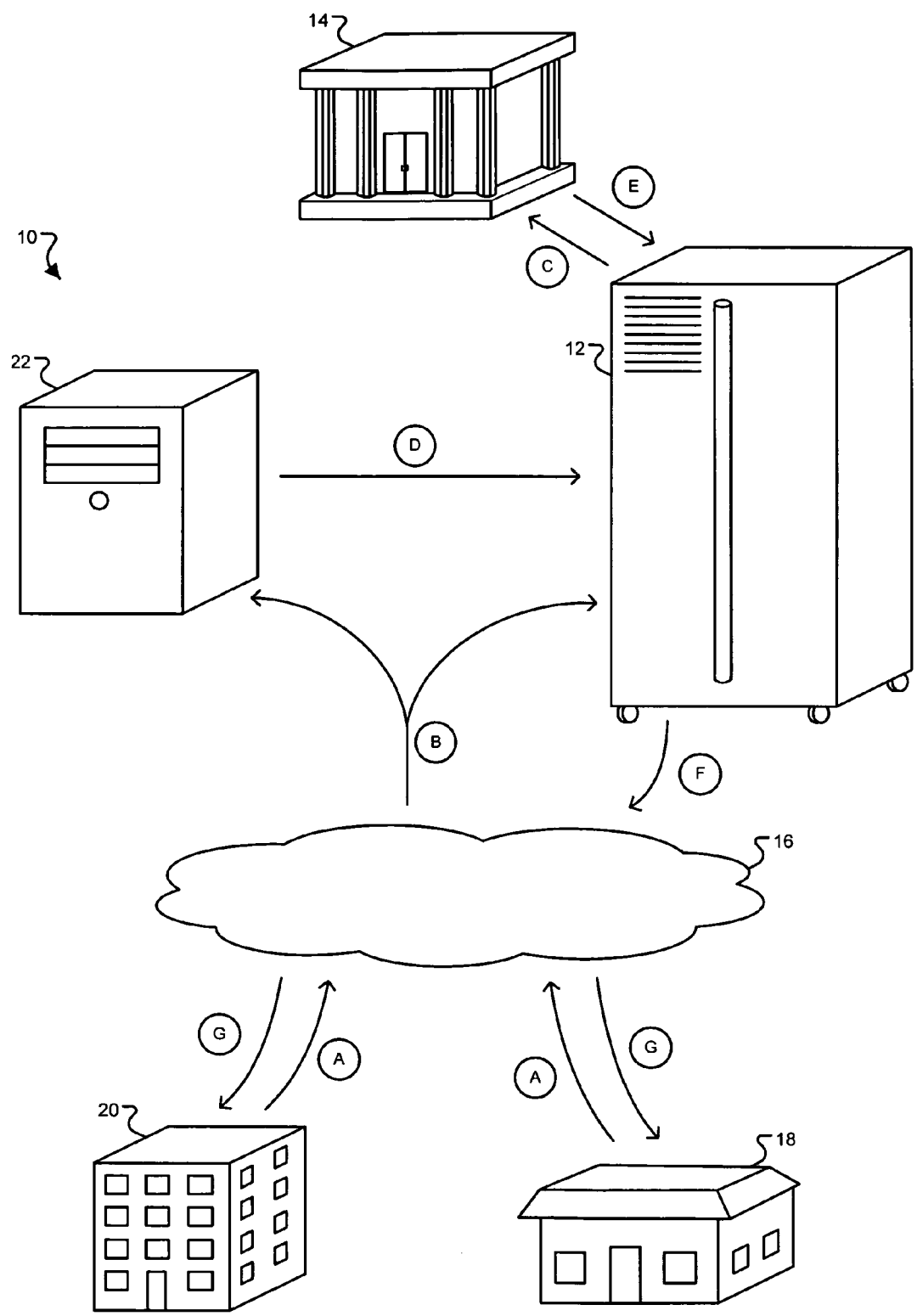
FIG. 1 is a conceptual diagram showing the flow of information in a card fraud detection system.

FIG. 1 is a conceptual diagram showing the flow of information in a card fraud detection system 10. The various flows are shown by lettered arrows to assist in understanding the order of operations in system 10. The process is shown as a real-time process, in that the system may deny a transaction immediately upon determining that the transaction is likely fraudulent, rather than making the determination after the transaction is complete and waiting until the next transaction for a denial.

In general, the detection process begins at a business, such as restaurant 18 or department store 20. In such a facility, a user may present a credit card, and the business may enter the card information into a credit card authorization device (e.g., by "swiping" the card). As shown by Arrows A, a request for authorization is sent through a network 16, such as the public telephone network, the internet, or a combination of such networks. The request may be encrypted or otherwise encoded for privacy and to prevent illicit interference with the request.

The network 16 may then forward the request on to a credit card processor, as shown by Arrow B, whose general processing system 12 is depicted by a mainframe computer, though its particular hardware arrangement may take any appropriate configuration. The processing system 12 may then, as shown by Arrow C, check with financial institution 14 to determine whether the account on which the transaction is requested has sufficient funds, or a sufficient credit line, to fill the transaction. The financial institution 14 may then respond, as indicated by Arrow E with an approval signal or a disapproval signal.

Separately, the credit card processor may also send the request represented by Arrow B to a fraud detection system 22. System 22 may be provided, as a sub-system separate from processing system 12, such as in the form of a server computer system. Although the system 22 may be incorporated more closely with general processing system 12, providing it as a separate component can provide several advantages. For example, the fraud detection system 22 can be more easily added to a system and maintained because its operation is relatively independent of the rest of the system. The general processing system 12 simply needs to receive a number (e.g., a fraud score) for each transaction or some other similar indication of the predicted behavior represented by the transaction (or the account), as shown by Arrow D. As such, the system may be more modular and thus allow more flexibility in configuration and operation. Such a separate arrangement may also assist in segregating potentially sensitive information stored in the fraud detection system 22, such as profile information about customers and merchants, that is needed to perform the fraud detection duties. In addition, the hardware may be more closely matched to the needs of the fraud detection system 22, which may be particularly important in systems where hundreds of operations per second are required.

The general processing system 12 may then take into account the fraud detection message of Arrow D and the approval message of Arrow E to determine whether the transaction should be authorized, denied, and/or referred. These messages may be combined with other considerations, as described more fully below, to determine how to handle the transaction. In particular, a fraud score may properly be given a different weight for different systems. Other factors that a system may consider in determining how to handle a transaction may include the amount of the transaction and the location of the transaction (e.g., domestic or overseas). Each factor can be given a weight or a triggering value that will determine how a transaction will be handled. For example, a system may be established to generate a referral or other exception where a standard fraud score is over 100, a transaction value is over $1000, and the transaction occurs overseas. Exceptions can also be generated for other combinations of those factors that make up an exception rule. The particular rules to apply and the form of the rules may be determined by looking for a maximizing result from an analysis of past data (e.g., data from past transactions, where the fraudulent transactions are known). The maximizing rules from such an exercise may then be applied on a going-forward basis to determine which transactions are exceptions, such as those deserving of a referral. The maximizing rules may be applied by fraud detection system 22, by processing system 12 (e.g., using a fraud score from fraud detection system 22 as an input), or in other manners as appropriate.

Depending on the outcome of the application of various rules to a transaction, various actions may be taken with respect to the transaction. For example, a so-called "referral" may be made, so that the transaction is stopped, and follow up is required. As one example of the follow up, a sales agent at a credit terminal may telephone a credit card company telephone number for further directions, or may be provided with a telephone number that the cardholder may call. The cardholder may then confirm that Where the decision affects the customer immediately (e.g., is a referral), a message reflecting this decision may then be transmitted to network 16 via Arrow F, and on to the businesses 18, 20 via Arrows G. At this point, the credit card authorization device may indicate whether the transaction has been confirmed or denied, and may also provide additional instructions, such as directions to contact a particular telephone number for follow-up on a transaction denial.

This description is intended to be exemplary only, and the system 10 may take any appropriate form. In addition, the form of the system 10 disclosed here is not directly dependent on the account-level optimization processes described in this document. As such, systems like system 10 have previously been implemented in the art. In short, FIG. 1 is simply intended to show an environment in which the account-level optimization features may be implemented.

Figure 2:
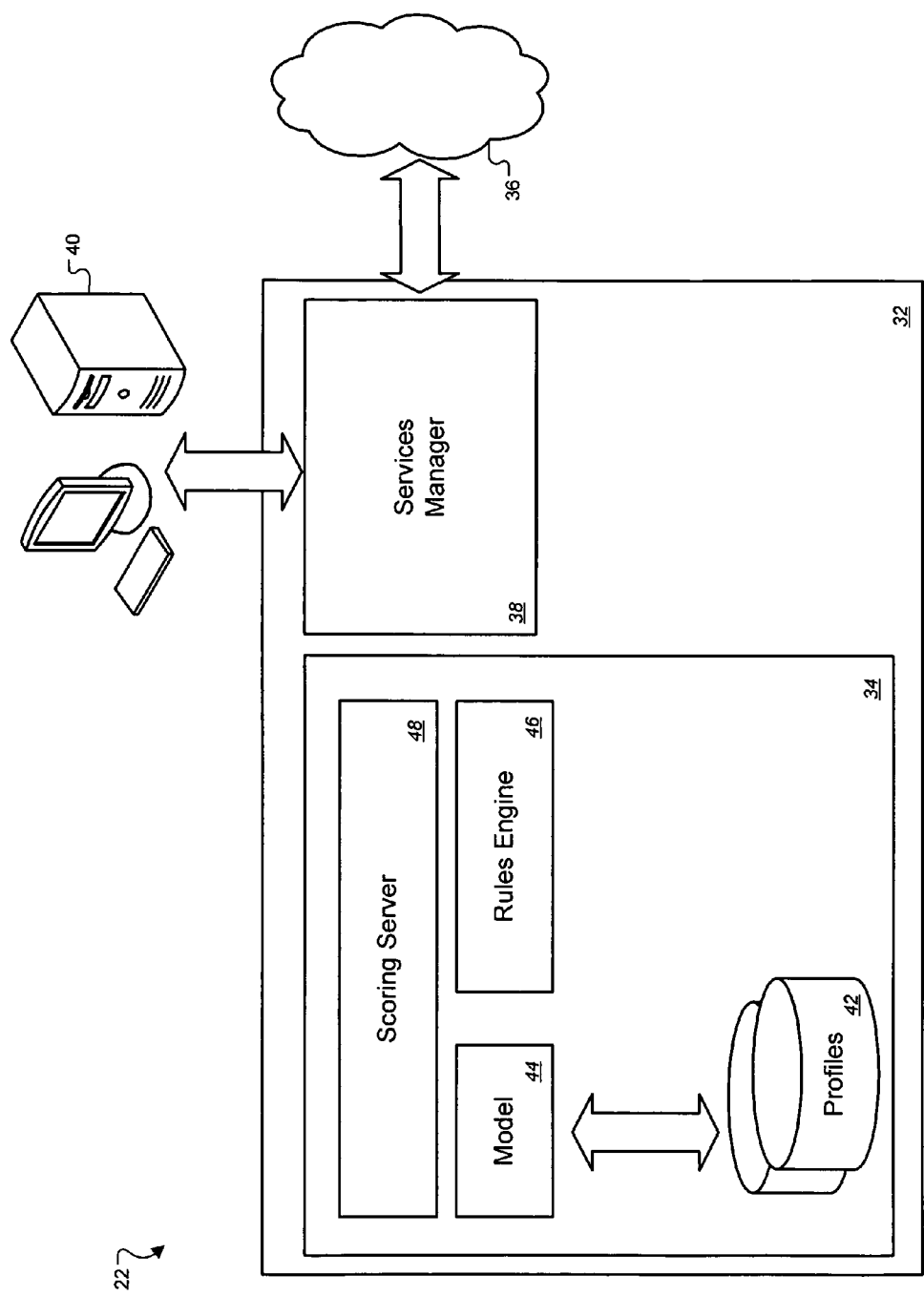
FIG. 2 is a block diagram of a fraud detection system for performing account-level optimization.

FIG. 2 is a block diagram of a fraud detection system for performing account-level optimization. This figure shows particular components in fraud detection system 22 of FIG. 1. The system 22 includes a fraud detection server 32 that may communicate with other components of a credit authorization system, for example, through network 36, which may be a LAN, WAN, the internet, or other similar connection. The server 32 may also communicate with terminal 40, which may be used to manage system 22. Terminal 40 may include, for example, a workstation or personal computer running management software that allows parameters of system 22 to be set and also permits troubleshooting or other monitoring of system 22. Other connections may also be provided, such as through network 36.

Communications with server 32 are managed by services manager 38. Services manager 38 may include modules for communication of operational information, such as the input of transactions data and the output of fraud scores or other fraud indicators. In addition, services manager 38 may include modules for managing system 22, such as configuration, maintenance, and other similar modules.

Operation of system 22 may be centered on fraud detection engine 34, which contains components needed to make a fraud determination of account-level parameters. For example, engine 34 may include a number of profiles 42, both of accounts and of merchants. Account profiles may indicate, for example, the types of purchases typically made on an account, and the size of such purchases. Merchant profiles may indicate types of purchases made from a particular merchant and the rate of fraudulent transactions for particular types of purchases from the merchant. The profiles may be used to create a composite indication, such as a fraud score, showing that a particular account or transaction is or is not subject to fraud.

The profiles may be operated upon by a fraud detection model 44, which may be a coded representation of mathematical approaches for determining whether particular activity appears fraudulent, based on certain inputs and restrictions. The model 44 may comprise, for example, solutions to linear programming (LP) problems and/or non-linear programming (NLP) problems, as discussed more fully below.

The model 44 may also take advantage of certain rules provided by a rules engine 46. In general, the model 44 may be made generically to apply across multiple different organizations. The rules engine 46 may then be customizable to address particular operations and preferences of each organization. For example, analysis of an organization's past transactions data may indicate that certain factors should be considered in a rules system. Also, an organization may be particularly interested in certain behavior, and may have systems that are limited in certain manners, so that their rules are selected differently than those of other organizations. In short, the rules may be altered and then applied to the model 44 to provide more flexibility and customizability, so as to make the system 22 flexible for customers, and also more effective in ferreting out fraud.

Scoring server 48 is the module that carries out the fraud detection techniques on transaction data or other data. Scoring server 48 runs the model 44 using rules in rules engine 46 to generate an indicator, such as a fraud score, of the likelihood that a transaction is, or transactions are, fraudulent. The scoring server 48 may return to a general processing system a simple fraud score, or a more complex representation of the activity in the account. Other organizations of components and processing may also be used. For example, scoring server 48 may produce a preliminary fraud score that is then applied as an input for further processing. In such further processing, a more refined fraud score may be produced that reflects certain decision rules. That further fraud score may be a binary representation (e.g., a go/no-go decision dictated by factors such as the preliminary fraud score, the amount of the purchase, and the place of the purchase) or a more graduated decision that is further acted upon to determine how to process a transaction or transactions.

FIG. 3 is a diagram showing a flow of card authorizations for a particular account. As shown, a user who is the accountholder makes no charges on July 1, two on July 2, three on July 3, and one on July 4. The transactions involve charges, respectively, for $200, $1000, $500, $50, $200, and $100. If the system is able to identify the activity on the account as fraudulent by the third transaction, and the system is a real-time system so that it may block a transaction as it is being requested, the system would save $850 (the final four transactions would be stopped) over a system that would not identify a problem until after the last transaction. If the system ran in on-line mode rather than real-time, so that problems could not be registered until after a transaction identified as problematic had already completed, the savings would be $350 (because the third transaction, for $500, would be flagged, but not until after it had been completed). Thus, where real-time operation is not possible, early detection of fraudulent transactions with optimized actions may be particularly important. (jpm: referrals apply real-time).

The referral optimization problem is to optimize the expected value of the referrals issued given certain specified, global constraints. The simplest, though nonetheless effective, referral strategy is to refer all transactions with a fraud score (such as a Falcon score) above a certain threshold. The threshold can be specified to either keep the overall false-positive rate within tolerable bounds, or the overall referral volume below a specified limit. The score threshold is easily modified to adjust to real-time, production results. For example, if referrals at a certain score begin to increase so as to outstrip an organization's ability to handle all of the referrals, the fraud score may be increased so that fewer cases reach that score and fewer cases are thus referred.

However, consideration only of discrete transactions against a set score does not solve the problem by which a system is near its maximum referrals, and the system needs to pick the most valuable prospects for referral. For example, if a system has only one referral left to issue before it is saturated, and two transactions appear with a fraud score of 999, one for $20.00 and one for $2000.00, then the system should clearly issue the referral on the transaction for $2000.00. An intelligent referral strategy should consider that exposure.

One approach is to replace the fraud score in the above strategy with a new "score"—the value assessment of each transaction. This new "score" would typically have the form:

$$V = \$ * P(f) - \hat{\$} * P(1-f) * P(1-c) - R \qquad \text{Eq. (1)}$$

where: $P(f)$, $P(1-f)$ is the probability of fraud, non-fraud; $\$$=transaction amount; $\hat{\$}$=value of non-fraud transaction=transaction amount*exchange rate; $P(1-c)$= probability of referral not completing (i.e., transaction lost); and R=referral fee. A second approach, discussed more fully here, is to simply provide the client with a set of actions.

Figure 4:
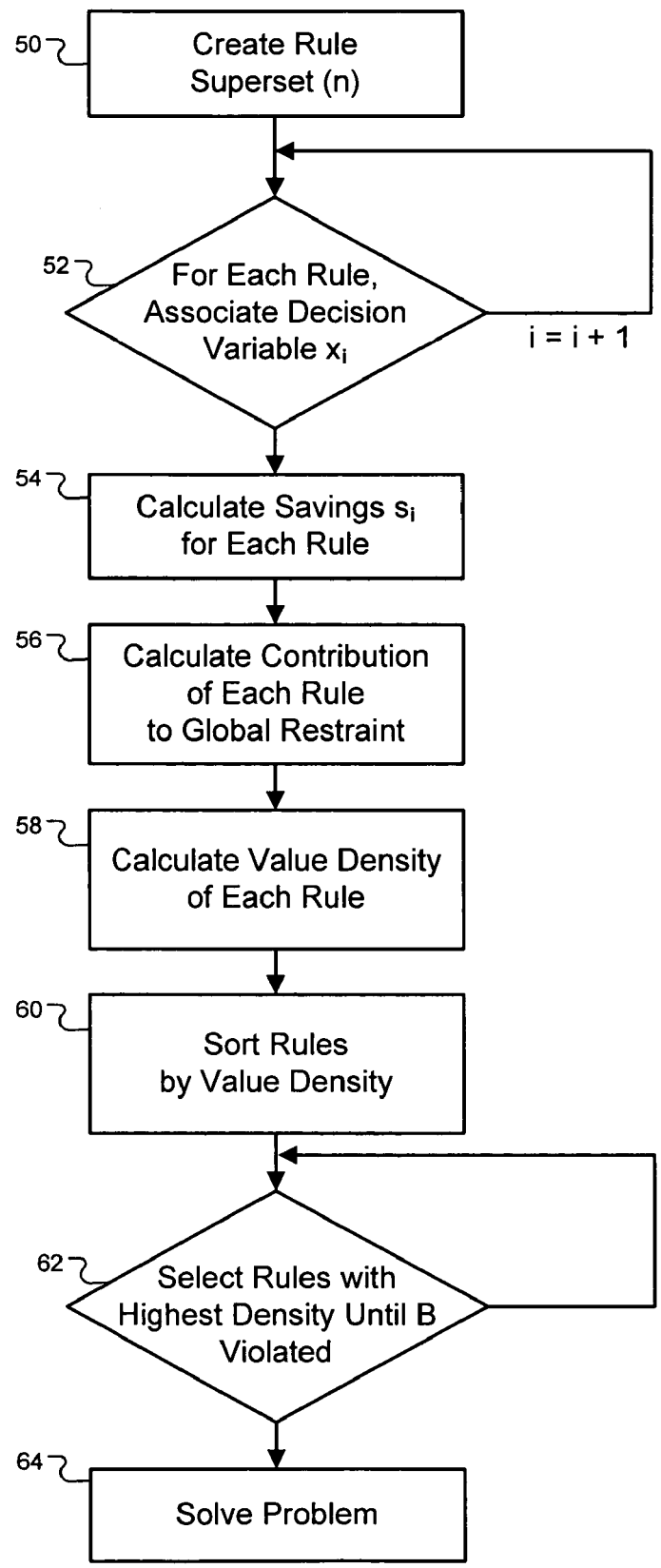
FIG. 4 is a flow chart showing an approach to optimizing referrals at a transaction level.

FIG. 4 is a flow chart showing an approach to optimizing referrals at a transaction level. The actions provided to the client are best encapsulated as simple rules, i.e., given certain characteristics of the transaction (e.g., fraud score, transaction amount, SIC code, etc.), then refer (or otherwise take action with respect to the account). The selection of these rules may be determined by an analysis on historical data. The approach begins by creating a superset of n possible rules (action 50). With each rule, i, the approach associates a decision variable, $x_i$ (action 52). The optimization problem is then selecting those decision variables (i.e., rules) that optimize a specified objective function given certain global constraints (e.g., referral volume, false-positive rate, etc.).

To avoid confusion, the approach may consider rules that are mutually disjoint (i.e., a transaction can fire only one possible rule). It may also consider rules of continuous variables such as a fraud score or a dollar amount that is inclusive, such as scores over a set level, which may be mapped to disjoint rules.

In the case that all metrics are transaction level and fractional solutions ($0 \leq x_i \leq 1$) are allowed, the optimization problem becomes a tractable linear programming problem. The simplest example for maximizing savings S is when there is one global constraint:

$$\text{Maximize } S = \sum_{i=1}^{n} s_i x_i \qquad \text{Eq. (2)}$$

$$\text{constraint } \sum_{i=1}^{n} b_i x_i \leq B$$

where $0 \leq x_i \leq 1$ $\forall i=1, \ldots, n$

For example, the constraint B may be the total number of accounts that may be referred.

The savings, $s_i$, attributable to each rule is calculated on the historical data (action 54), wherein correctly identified fraud transactions are simulated as having been stopped, while incorrectly flagged non-fraud transactions contribute a potential loss in revenue. In a similar fashion, the contribution, $b_i$, of each rule to the global constraint is calculated (action 56). In the case the constraint corresponds to the total referral volume, $b_i$, and is simply the number of transactions flagged by a given rule.

Although a given transaction rule is seen to fire or not fire, the decision variables in the above formulation are allowed to assume a continuum of values. While the approach could introduce a random number generator to address fractional solutions, the solution to equation (2) in fact generates at most one non-integer value for $x_i$ and can be solved relatively simple as outlined below.

In contrast, requiring the decision variables to be binary, $x_i \in \{0,1\}$, converts equation (2) into the Knapsack problem a (NP) hard problem that has no known polynomial-time solution. For the integer-relaxed Knapsack problem, equation (2), for each rule i, the approach calculates a value-density $\rho_i = s_i / b_i$. (action 58). The approach then sorts the rules by their value density (action 60). The optimization problem is solved by successfully selecting (i.e., $x_i=1$) the rules with the highest density, provided that the global constraint B is not violated by the incremental addition of $b_i$ to the tally $$\sum_{j \in selected} b_j$$

(action 62).

Once the tally arrives at the point that the addition of the next rule i* would lead to violating B (action 62), the integer-relaxed problem is solved using a fractional value of $x_{i*} < 1$; an approximate solution to the Knapsack problem can then be obtained by setting $x_{i*}=0$, or by relaxing B so that one can set $x_{i*}=1$, or by searching for a remaining rule that can be inserted while satisfying the overall constraint (action 64).

Equation (2) may be extended for a case in which the savings, $s_i$, and constraints, $b_i$, are based upon account-level metrics. The atomic units of consideration are still transactions, and the referral rules are still designed to act on a transaction, but the fact that transactions can be linked at the account level turns the linear programming problem of equation (2) into a non-linear programming problem NLP:

$$\text{Maximize } S(x_1, x_2, \ldots, x_n)$$

$$\text{constraint } b(x_1, x_2, \ldots, x_n) \leq B \qquad \text{Eq. (3)}$$

where $x_i \in \{0,1\}$ $\forall i=1, \ldots, n$

Integer solutions to the non-linear programming problem (i.e., a rule either is or is not selected) may be the focus of a solution. This problem simplifies to the integer Knapsack problem in the case that each transaction has a unique account, so it is plainly at least NP-Hard. An approximate solution may be generated using a sequential application of the Dantzig knapsack solution. See G. B. Dantzig, *Linear Programming and Extensions*, Princeton University Press, 1998 (11th reprint of 1963 original ed.)

Figure 5:
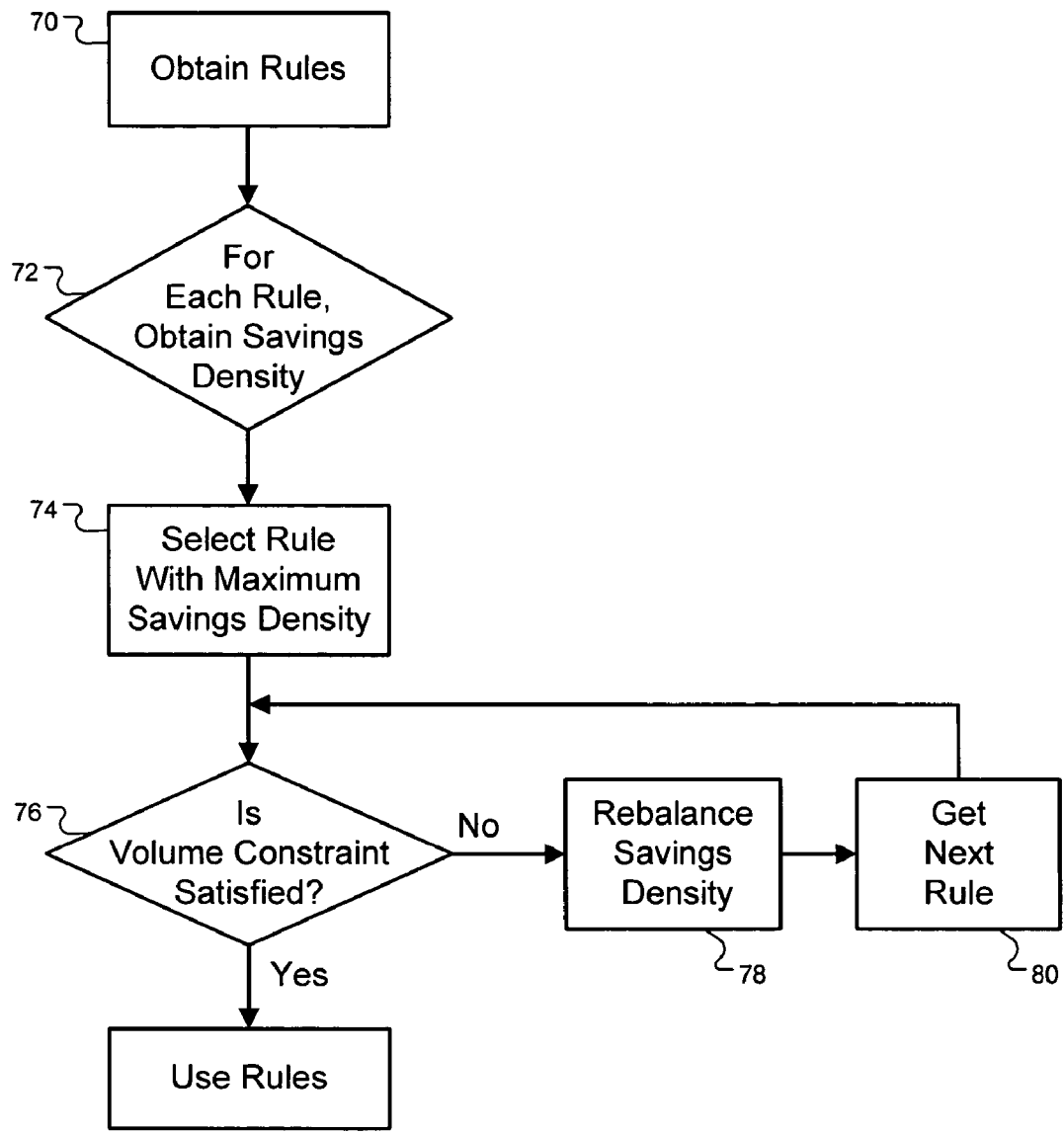
FIG. 5 is a flowchart showing an approach for solving a non-linear programming problem for account-level optimization.

FIG. 5 is a flowchart showing an approach for solving a non-linear programming problem for account-level optimization. For concreteness, the approach takes the objective function S=total $ saved, and the single global constraint B=to the volume of accounts referred. Initially, the approach involves obtaining the applicable rules to be applied (action 70)

1) For each rule i, obtain the savings density (action 72):

$$\rho_i(0) = \frac{\$ \text{ saved by stopping fraud accounts in bucket}}{\# \text{ accounts in bucket}}.$$

2) The first rule selected in the optimization process is (action 74):

$$\rho^1 = \text{Max}_i(\rho_i(0)).$$

3) Determine if Volume constraint is satisfied, if yes, then proceed (action 76).

4) For remaining rules, "rebalance" the savings density (action 78):

$$\rho_i(1) = \frac{\$ \text{ saved stopping fraud accts that fire rule} - \$ \text{ already stopped (time sensitive) for fraud accts in } \rho^1}{\# \text{ accts fired by rule} - \# \text{ accts also in } \rho^1}.$$

5) Select next rule (action 80)

$$\rho^2 = \text{Max}_i(\rho_i(1)).$$

6) Iterate until Volume constraint is satisfied:

$$\rho_i(n) = \frac{\$ \text{ saved stopping fraud accounts that fire rule} - \sum_{j=1}^{n-1} \$ \text{ already stopped (time sensitive) for fraud accts in } \rho^j}{\# \text{ accounts firing rule} - \sum_{j=1}^{n-1} \# \text{ accounts also in } \rho^j}.$$

$$\rho^n = \text{Max}_i(\rho_i(n)).$$

When evaluating the value density, the time-order of the transactions may be tracked to assess the value of stopping a Fraud account, while also avoiding double-counting.

The complexity of this process may be reduced in applicable manners. For example, in an initial set up stage, a pass may be made over all transactions in the data to extract for each account the first transaction that fires each rule. For the case of the fraud accounts, a dollar amount associated with the potential savings may also be calculated for each extracted transaction. This then may create a condensed data set that, in the worse case scenario, is of O(number of rules*number of accounts) (every account has at least one transaction firing every rule).

Given this set up, then the approach obtains that in the worse case scenario, all accounts in the condensed data sample are involved in each rebalancing stage. Because there can be as many rebalancing stages as there are rules, the complexity of the above algorithm is O(number of rules squared*number of accounts). This is extremely tractable.

The approach just described and similar approaches may be referred to as the Sequential Knapsack algorithm.

These approaches may be use to identify a rule or rules (with values for triggering those rules) that maximize or nearly maximize the objective function of savings, for the case of historical data—with a particular constraint of referral (or other exception handling) volume, or other desired restraint. Those rules (e.g., in multiple combinations to form a suite of rules) may then be applied to future transactions, either as combined with a fraud score or in generating a fraud score, to determine actions, such as referral, to take against future transaction.

Example 1

The following hypothetical example is intended to provided additional explanation of the account level optimization problem. Assume there are four rules. For simplicity, assume that every fraud generates a loss of $1000. The global constraint on the total number of accounts referred is 170. The four rules each have the following impact on frauds and non-frauds:

Rule1: 100 non-frauds, with overlap with only non-frauds in Rule2; 40 frauds that have no overlap with any other rule.

Rule2: 50 non-frauds, where 60% overlap with non-frauds from Rule1; 10 frauds that have no overlap with any other rule.

Rule3: 115 non-frauds with complete overlap with non-frauds in Rule4; 30 frauds that have no overlap with any other rule.

Rule4: 115 non-frauds that are exactly the same non-frauds in Rule3; 25 frauds that have no overlap with any other rule.

Taken one at a time, the value densities, in terms of the value of the objective function divided by the value of the constraint, are:

For Rule1=40,000/140~286;
For Rule2=10,000/60~167;
For Rule3=30,000/145~207;
For Rule4=25,000/140~179

The Sequential Knapsack algorithm starts by first selecting Rule1. Only Rule2 is affected by rebalancing. The rebalanced density of Rule2=10,000/30~333 (the denominator is the 20 non-frauds not overlapping with Rule1+the 10 frauds caught by Rule2). Hence Rule2 is next selected. The Sequential Knapsack algorithm would then stop having impacted the maximum number of accounts permitted (170). The solution has a total value=$50,000.

The global optimum, however, is achieved with Rules 3+4: total value=$55,000. The hole that Example 1 illustrates in the Sequential Knapsack algorithm is that it builds a solution by restricting the possible rule combinations to consider. While a system can modify the algorithm to include more possible combinations (e.g. including a step that evaluates the rebalanced densities of rules taking two at a time) this would still again be an approximation that can ultimately fail: the NLP is only fully specified when all possible rule-combinations are explicitly enumerated & evaluated, as the values of either $S(x_1, x_2, \ldots, x_n)$ or $b(x_1, x_2, \ldots, x_n)$ cannot be anticipated. This inability stems from the potentially arbitrary nature that transactions in a data set can be linked to accounts (the above example has explicitly utilized that freedom).

To demonstrate the inherent intractability of the NLP, one may consider the act of evaluating the potential incremental value of a rule $x^*$ to a pre-existing selected set of rules $\{x_1, x_2, \ldots, x_m\}$. As earlier, the approach takes $S(x_1, x_2, \ldots, x_n)$ to be the potential fraud savings and $b(x_1, x_2, \ldots, x_n)$ to be simply the number of referrals issued. To determine $b(x_1=1, x_2=2, \ldots, x_m=1, x^*=1)$ one needs to add to the (by assumption, already known) value $b(x_1=1, x_2=2, \ldots, x_m=1)$ the number of accounts that uniquely fire rule $x^*$, i.e., that have a transaction that fires rule $x^*$ but contain no transaction already firing any of the rules $\{x_1, x_2, \ldots, x_m\}$. (All decision variables are set to zero by convention unless specified otherwise.)

This determination of unique accounts can generally only be determined by explicitly examining each account contributing to $b(x^*=1)$. To determine the incremental savings to S, one not only needs to identify the fraud savings associated with the unique fraud accounts, but should also examine the time sequence of transactions for each fraud account already contributing to $S(x_1=1, x_2=2, \ldots, x_m=1)$ to determine if the new rule $x^*$ adds additional savings by firing before any of the rules $\{x_1, x_2, \ldots, x_m\}$. Once again these values can generally only be determined through explicitly identifying and then examining the accounts involved.

The implication of these considerations is that there is no general algorithm operating in polynomial time (i.e. short of an exhaustive search of all rule combinations) that will always find the global optimum to this non-linear problem.

It is common to face multiple constraints in seeking to optimize such a system. The Sequential Knapsack approach may also be applied to such multiple constraint situations. The approach first expands the NLP to the case with m multiple constraints:

Maximize $S(x_1, x_2, \ldots, x_n)$ constraint $b_j(x_1, x_2, \ldots, x_n) \leq B_j \forall j=1, \ldots, m$  Eq. (4)

where $x_i \in \{0,1\} \ \forall i=1, \ldots, n$

For each decision variable (rule), a radial projection of the constraints is defined, wherein each component is normalized by the amount of each constraint left unselected. Initially this projection is simply:

$$\beta(x_i = 1) = \frac{1}{\sqrt{\left(\frac{b_1(x_i=1)}{B_1}\right)^2 + \left(\frac{b_2(x_i=1)}{B_2}\right)^2 + \ldots + \left(\frac{b_m(x_i=1)}{B_m}\right)^2}}. \quad \text{Eq. (5)}$$

The value density function may then be defined in terms of these radial projections:

$\rho(x_i=1) = S(x_i=1)/\beta(x_i=1)$.  Eq. (6)

Having effectively reduced the problem to one-dimension, the Sequential Knapsack algorithm may then be applied to it. The value density of equation (6) is used to identify the Maximal rule. The approach next checks that no global constraint is violated by selecting the Maximal rule. After the Maximal rule, $i^*$, has been selected, a rebalancing is performed: the global constraints are adjusted, $B_j \rightarrow B_j - b_j(x_{i^*}=1)$, the radial projections of equation (5) for the remaining (unselected) rules recalculated, and a rebalancing of the value density of equation (6) is calculated. Iterating this procedure until a constraint is violated generates a solution to the multiple-constraint integer NLP problem.

A group of three examples may provide additional information regarding performance improvements that may be achieved using the approaches discussed above. The examples are from studies conducted by an optimization tool, with minor modifications made for each of the three cases, and the results are shown graphically in FIGS. 6-10.

Example 2

Figure 6:
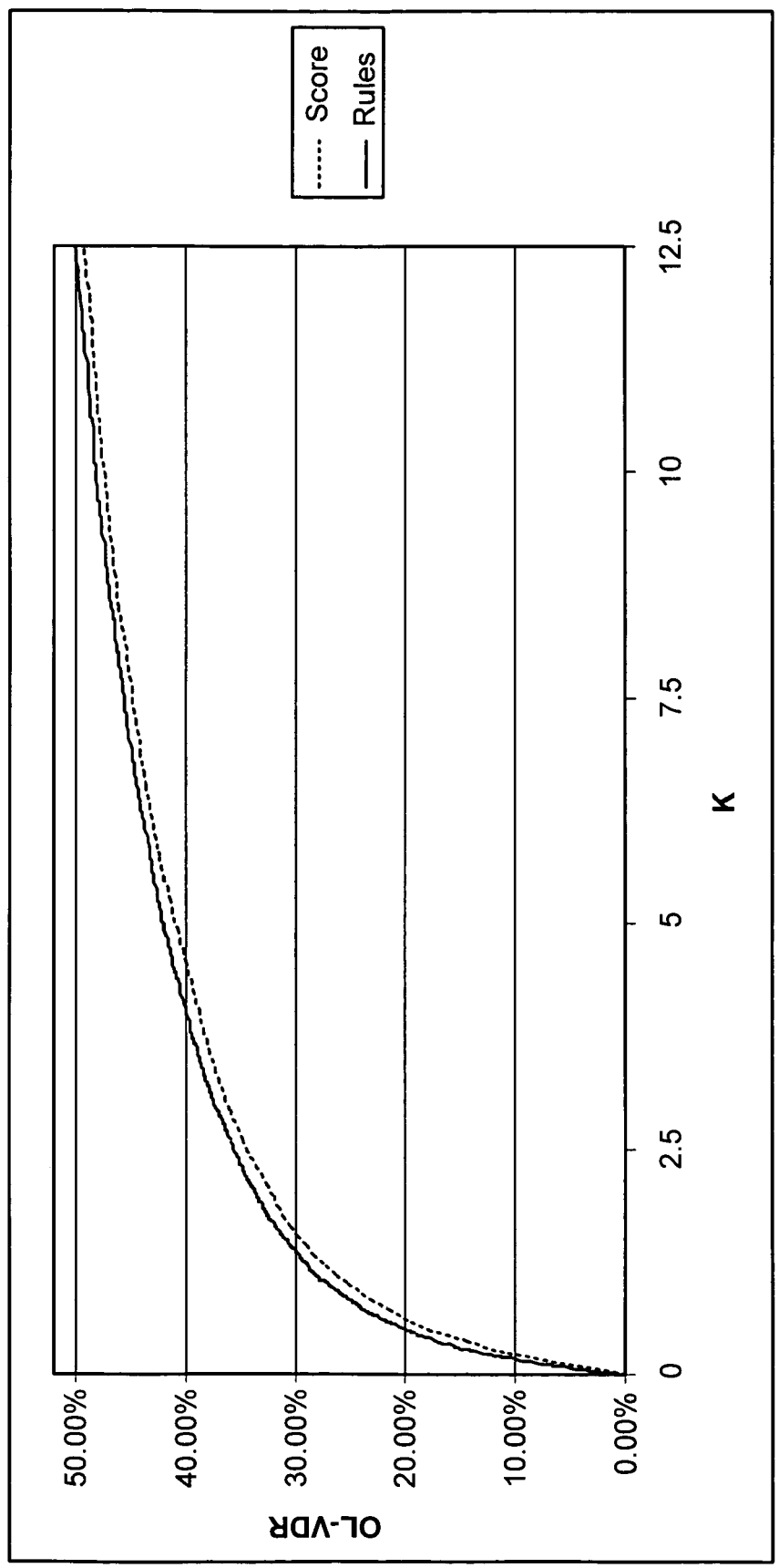
FIG. 6 is a graph showing optimization performance as a function of an on-line value detection rate for one example.

FIG. 6 is a graph showing optimization performance as a function of an on-line value detection rate for one example. The x-axis (K) reflects the volume of transactions. The y-axis is an on-line value detection rate (VALUE DETECTION RATE). The on-line designation indicates that the system was not real-time so that it could stop transactions in progress. The VALUE DETECTION RATE designation indicates the savings that would be achieved over the use of the standard scorer alone. Stated another way, the figure indicates the percentage of fraud dollars that the system could have intercepted during the period.

Five optimized rule sets were created for different case volumes, with no country-specific rules. The optimization was to be done on authorizations only, although both the authorizations and postings were processed. In addition, it was also agreed that the optimized rule set should take into account:

Purchase versus Cash
Cross Border versus Domestic
Card Not Present versus Card Present
Credit versus Debit Actual historical transaction information from an approximately nine-month period was used. The search space for the optimization was defined by the fraud score, transaction amount, and the above four decision keys constructed the search space of the optimizations. To reduce the computation cost, "low-score" accounts (whose maximum score was lower than 500 during the entire scoring window) were filtered out before the optimization. Scores and transaction amounts were binned by "equal fraud population" methods.

In this project, 30 bins were used for the score, and 5 bins for transaction amount. In addition, the score bin in a rule was upward inclusive. For example, a rule having "score threshold 950" would fire all the transactions whose score was greater than or equal to 950 with other conditions met in the rule. The same binning logic regarding score was applied to the other two case studies in this section.

In addition, the study produced optimized rule sets with different case volume numbers of K=(#cases created)/(Total #frauds), at values K=2.5, K=5, K=7.5, K=10, and K=12.5. For K=5, the sample rule set is as follows:

| credit/debit | merchandise/cash | CP/CNP | Domestic/cross border | transaction amount | score threshold |
|---|---|---|---|---|---|
| credit | merchandise | CP | Domestic | >=2050.00 | 790 |
|  |  |  |  | >=1000.00 && <2050.00 | 910 |
|  |  |  |  | >=470.00 && <1000.00 | 930 |
|  |  |  |  | >=170.00 && <470.00 | 955 |
|  |  |  |  | <170.00 | 955 |

The study also looked at four transaction conditions: (1) purchase vs. cash; (2) credit vs. debit; (3) domestic vs. foreign; and (4) card present vs. card not present. Combined, these conditions created sixteen different condition combinations, or segments. The system was structured to allow greater weighting of particular segments, so that a user could "turn up the volume" on a segment of greatest concern. For example, a card issuer in the UK may be suffering cross-border ATM debit card counterfeit fraud, while an issuer in France may be suffering from high stolen cards used for merchandise. If an issuer turns up the volume on a segment of greatest concern, they can generate more referrals for such activity and detect more fraud for it.

For the five levels of K, the increase in the value detection rate are shown in the following tables where each table entry presents the contribution of each segment to the overall online value detection rate:

| K 2.5 | Card Present Domestic | Card Present Foreign | Card not Present Domestic | Card not Present Foreign |
|---|---|---|---|---|
| Credit Purchase | 4.23% | 10.87% | 1.06% | 5.39% |
| Credit Cash | 0.40% | 0.47% | 0.16% | 0.68% |
| Debit Purchase | 3.85% | 5.84% | 0.36% | 0.79% |
| Debit Cash | 1.07% | 0.44% | 0.05% | 0.01% |

| K 5 | Card Present Domestic | Card Present Foreign | Card not Present Domestic | Card not Present Foreign |
|---|---|---|---|---|
| Credit Purchase | 5.09% | 13.06% | 1.36% | 6.81% |
| Credit Cash | 0.61% | 0.05% | 0.21% | 0.38% |
| Debit Purchase | 4.41% | 6.38% | 0.51% | 0.94% |
| Debit Cash | 1.09% | 0.50% | 0.06% | 0.09% |

| K 7.5 | Card Present Domestic | Card Present Foreign | Card not Present Domestic | Card not Present Foreign |
|---|---|---|---|---|
| Credit Purchase | 6.09% | 13.91% | 1.65% | 6.89% |
| Credit Cash | 0.74% | 0.56% | 0.25% | 0.42% |
| Debit Purchase | 5.07% | 6.53% | 0.58% | 1.13% |
| Debit Cash | 1.06% | 0.56% | 0.06% | 0.12% |

| K 10 | Card Present Domestic | Card Present Foreign | Card not Present Domestic | Card not Present Foreign |
|---|---|---|---|---|
| Credit Purchase | 6.62% | 14.53% | 1.92% | 7.36% |
| Credit Cash | 0.78% | 0.56% | 0.25% | 0.43% |
| Debit Purchase | 5.28% | 6.74% | 0.63% | 1.33% |
| Debit Cash | 1.09% | 0.54% | 0.06% | 0.11% |

| K 12.4 | Card Present Domestic | Card Present Foreign | Card not Present Domestic | Card not Present Foreign |
|---|---|---|---|---|
| Credit Purchase | 7.01% | 14.73% | 2.33% | 7.58% |
| Credit Cash | 0.85% | 0.62% | 0.25% | 0.42% |
| Debit Purchase | 5.47% | 6.75% | 0.65% | 1.52% |
| Debit Cash | 1.09% | 0.56% | 0.06% | 0.10% |

FIG. 6 shows the lift achieved versus merely using a fraud score approach. The added lift is minimal, however, because the studied system operated in online mode rather than real-time. Also, the performance of the system being studies was also very strong before the study, so it is difficult to improves its score.

Example 3

Figure 7:
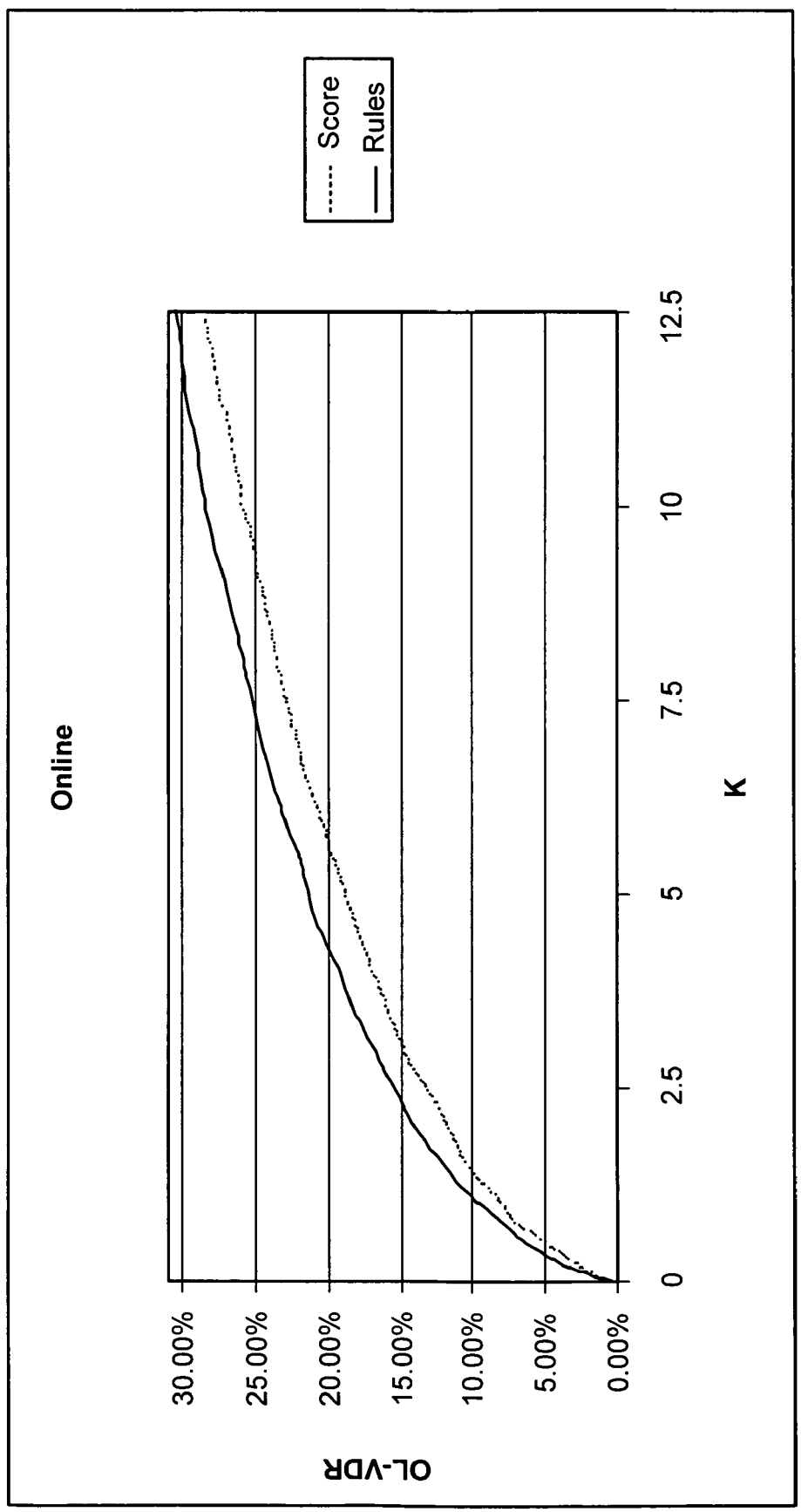
FIG. 7 is another graph showing optimization performance as a function of value detection rate for an online system.

FIG. 7 is another graph showing optimization performance as a function of value detection rate for an online system. In the study associated with FIG. 7, case-creation optimization and referral optimization was tested for data from a consortium of organizations over about eight months. To simplify the study, only a Falcon fraud score and the transaction amount were included in the optimization. Adding more segmentation keys may improve the performance. FIG. 7 shows the expected savings achieved by adding the system to a standard score-based system, with significant lift for case-creation and referral optimization.

Figure 8:
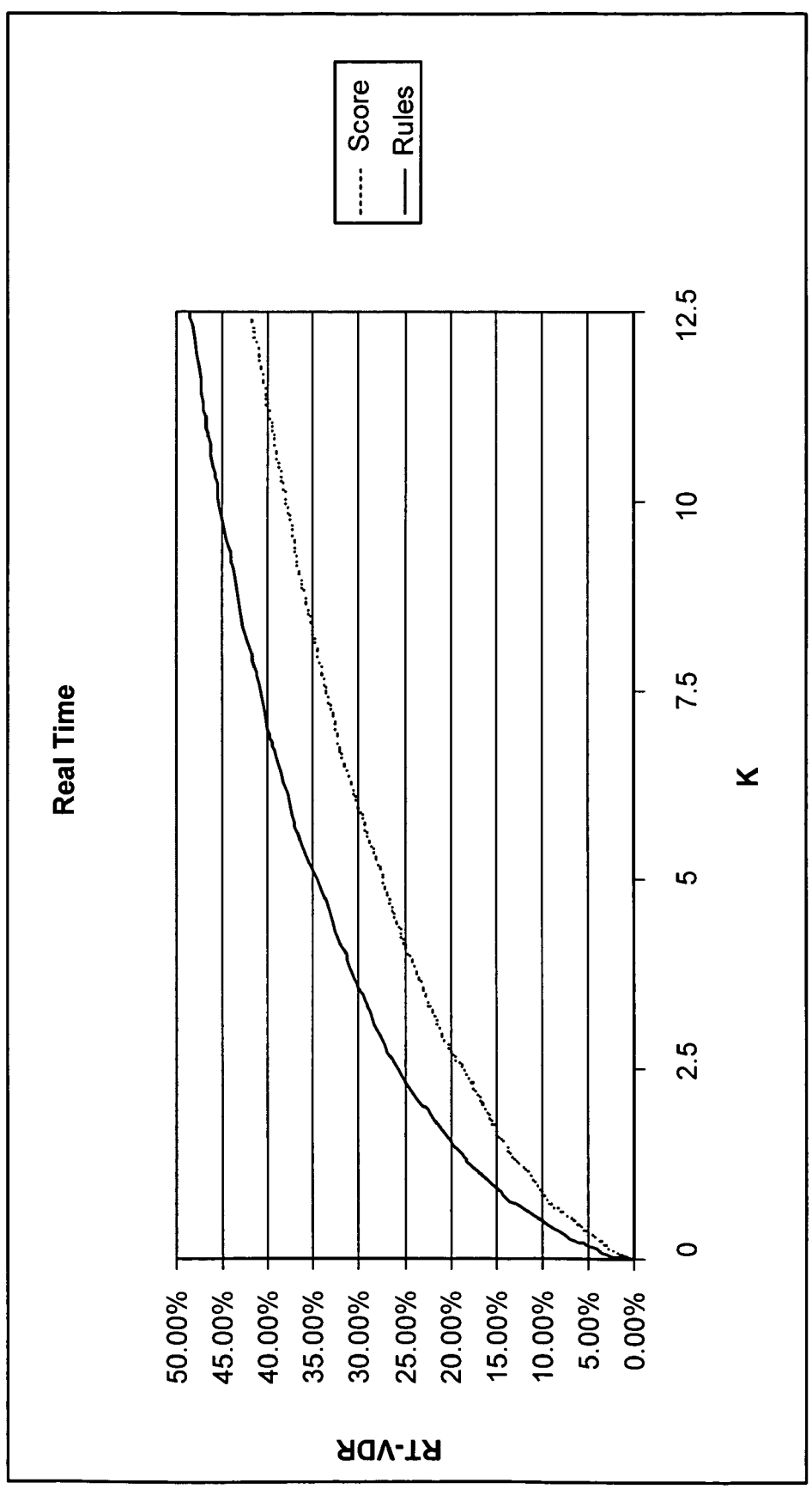
FIG. 8 is a graph showing optimization performance as a function of value detection rate for a real time system.

FIG. 8 is a graph showing optimization performance as a function of value detection rate for a real time system as a function of K. The lift for this system was particularly pronounced.

Example 4

Figure 9:
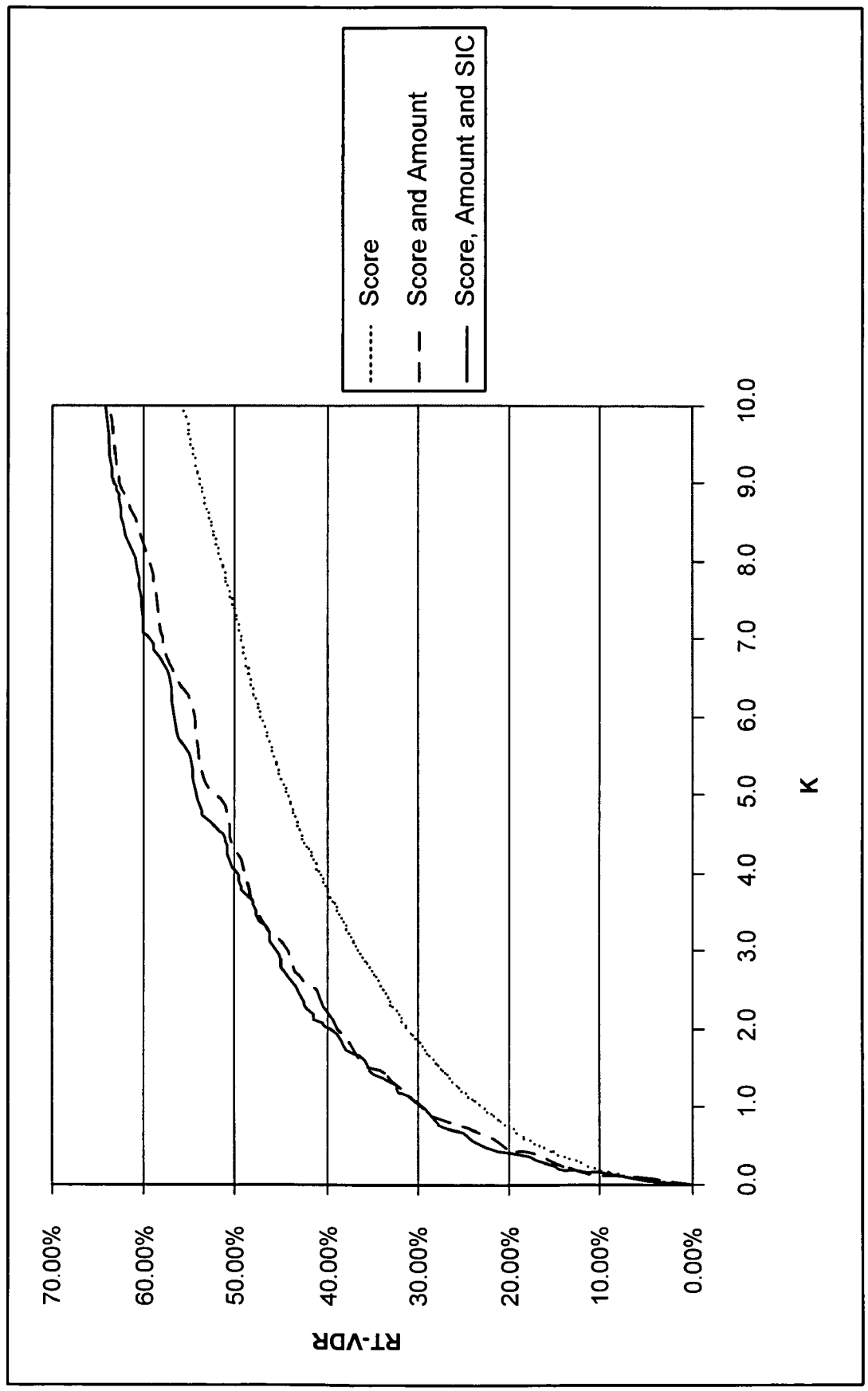
FIG. 9 is a graph showing optimization performance as a function for a real time system.
Figure 10:
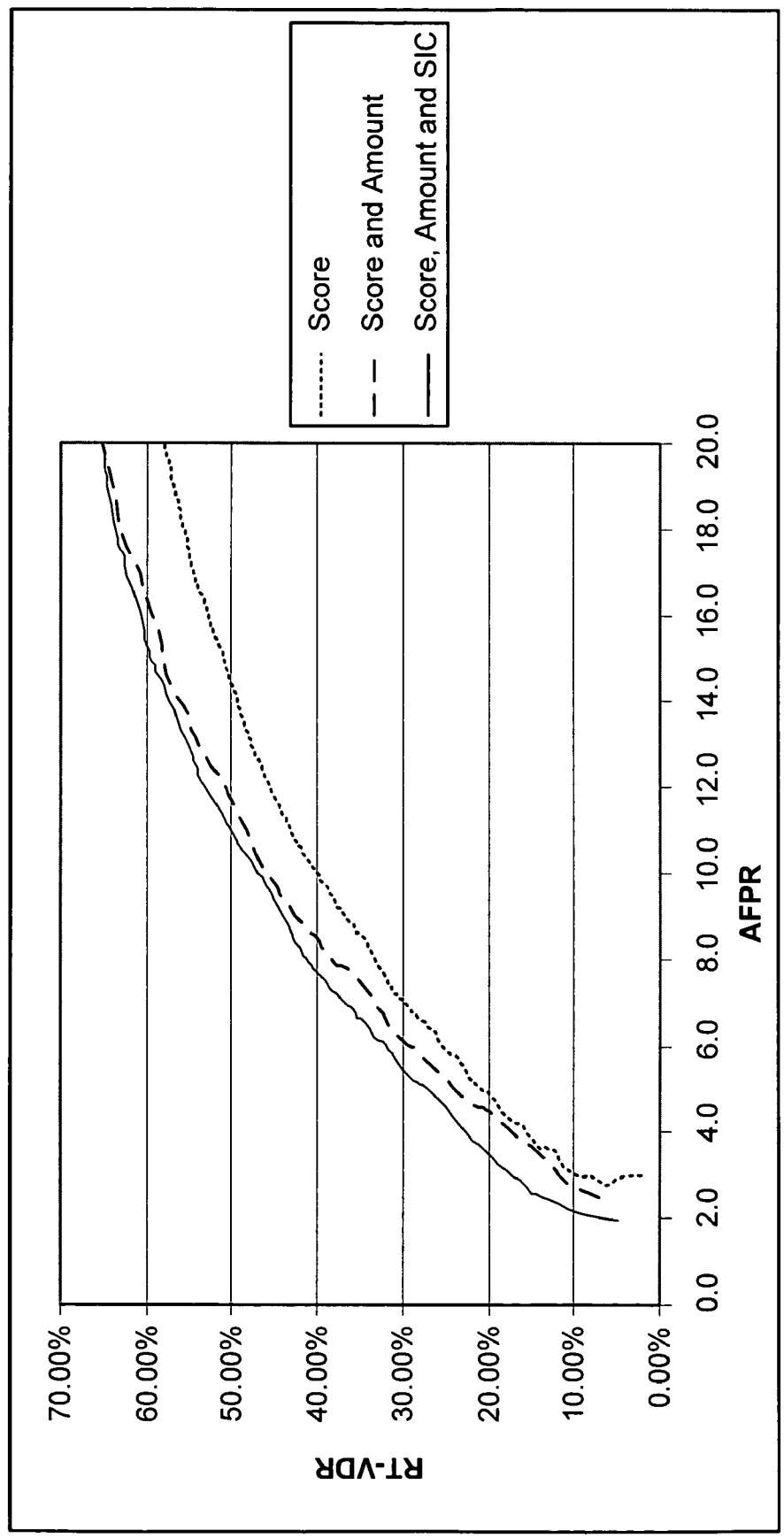
FIG. 10 is another graph showing optimization performance as a function of value detection rate and account false positive rate.

FIG. 9 is a graph showing optimization performance as a function for a real time system, while FIG. 10 is another graph showing optimization performance as a function of value detection rate and an account false positive rate, which is simply the number of non-fraud accounts that are identified as fraud, for each scored fraud account. The data for the study was form an approximate nine month period, and two different optimization rule sets were applied. One rule set only used the fraud score and the transaction amount, while the other used the fraud score, transaction amount, and the SIC. Twenty top SIC categories were identified as "risky SIC" by looking at the proportion of the fraud dollars in each SIC, as well as considering the size of the SIC.

Before the optimization, customer-provided rules were used to exclude non-referable transactions and transactions not to be scored in real-time. In addition, the study was formed to provide figures based on K and on AFPR (Account False Positive Rate=(#Legitimate Accounts Impacted)/(# of Fraud Accounts Detected)), which would help to minimize the risk of negative customer impact. To do so, the savings density was modified by adding a penalty to AFPR:

$$\rho_i(0) = \frac{(\$ \text{ saved by stopping fraud accounts in bucket})/(\text{\# fraud accounts in bucket}/\text{\# nonfraud accounts in bucket})}{\text{\# accounts in bucket}}$$

The value of savings was discounted by the AFPR that the bucket causes.

$\rho_i(1) \ldots \rho_i(n)$ were also modified accordingly.

To ensure statistical robustness, a selected bucket was required to contain a minimum number of non-fraud accounts (e.g., 20). Also, some small buckets were merged with neighbor buckets. Buckets with too few non-fraud accounts were merged with the next level lower score-threshold bucket. As shown in the graphs, there was significant lift in FIGS. 9 and 10.

Figure 11:
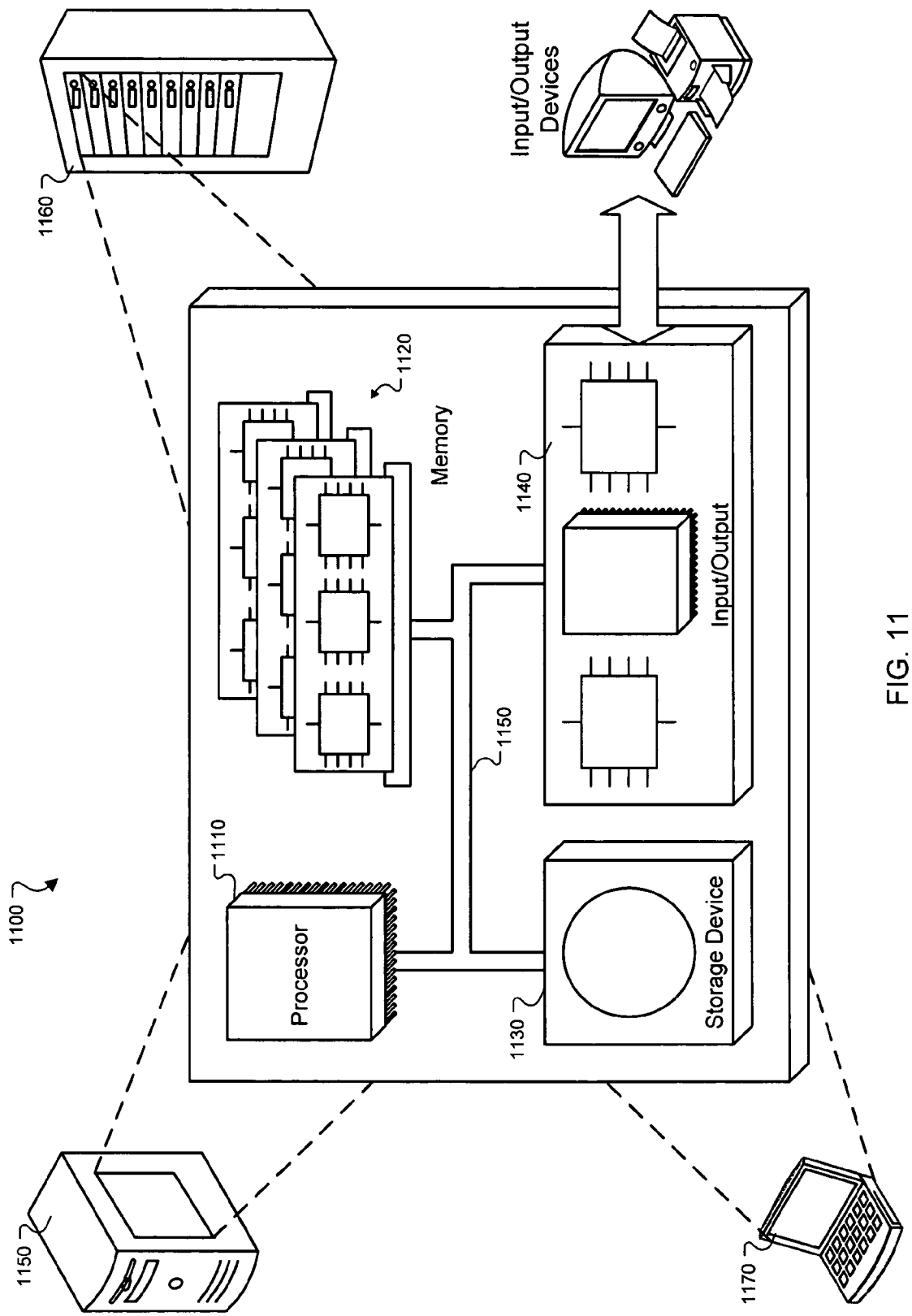
FIG. 11 is a block diagram of a computing device that may be used to implement the systems and methods described in this document.

FIG. 11 is a block diagram of a computing device 1100 that may be used to implement the systems and methods described in this document, as either a client or as a server or plurality of servers. The computing device 1100 includes a processor 1110, a memory 1120, a storage device 1130, an input/output controller 1140, and a network adaptor (not shown). Each of the components 1110, 1120, 1130, and 1140, are interconnected using a system bus. The processor 1110 is capable of processing instructions for execution within the computing device 1100. The processor 1110 is capable of processing instructions stored in the memory 1120 or on the storage device 1130 to display graphical information for a GUI on an external input/output device that is coupled to the input/output controller 1140. In other implementations, multiple processors and/or multiple buses may be used, as appropriate. Also, multiple computing devices 1100 may be connected, with each device providing portions of the necessary operations.

The memory 1120 stores information within the computing device 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the computing device 1100. In one implementation, the storage device 1130 is a computer-readable medium. In various different implementations, the storage device 1130 may be a floppy disk device, a hard disk device, an optical disk device, or a tape device, or an array of devices, including devices in a storage area network or other configuration.

In one implementation, a computer program product is tangibly embodied in an information carrier. The computer program product contains instructions that, when executed, perform one or more methods, such as those described above. The information carrier is a computer- or machine-readable medium, such as the memory 1120, the storage device 1130, or a propagated signal.

The input/output controller 1140 manages input/output operations for the computing device 1100. In one implementation, the input/output controller 1140 is coupled to an external input/output device, such as a keyboard, a pointing device, or a display unit that is capable of displaying various GUI's to a user. The computing device 1100 further includes the network adaptor. The computing device 1100 uses the network adaptor to communicate with other network devices.

The computing device 1100 may be implemented in a number of different forms, as shown in the figure. For example, it may be implemented as a standard server 1150, or multiple times in a group of such servers. It may also be implemented as part of a rack server system 1160. In addition, it may be implemented in a personal computer such as a laptop computer 1170. Alternatively, components form computing device 1100 may be combined with other components in a mobile device (not shown), such as cellular telephone, a smart phone, or a personal digital assistant. Each of such devices may contain one or more of computing device 1100, and an entire system may be made up of multiple computing devices 1100 communicating with each other.

The systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. A number of embodiments of the invention have been described. Nevertheless, it will be understood that various modifications may be made without departing from the spirit and scope of the invention. For example, the flow charts here are shown with exemplary actions in exemplary orders, but steps may be added or removed as appropriate, and may also be reordered. Accordingly, other embodiments are within the scope of the following claims.

What is claimed is:

1. A computer-implemented method of generating a model for performing account-level fraud detection, comprising:
    obtaining a plurality of candidate rules for referrals of financial transactions;
    electronically determining with a processor one or more initial value densities that correspond to per account savings levels associated with applying the candidate rules to financial transactions;
    electronically selecting a rule from the plurality of candidate rules based on the determined value densities;
    iteratively rebalancing value densities for the remaining rules of the plurality of candidate rules and selecting a next rule with the processor until a volume constraint is satisfied, to obtain a sub-set of rules from the plurality of candidate rules for application to one or more financial transactions, wherein the rebalanced value density for at least one of the remaining rules is different than the initial value density for the at least one of the remaining rules; and
    providing the sub-set of rules for use by a fraud detection system in referring financial transactions for fraud-related action.

2. The method of claim 1, wherein the plurality of candidate rules are referral rules that trigger an account referral.

3. The method of claim 1, wherein the plurality of candidate rules are derived from historical transactional data.

4. The method of claim 1, wherein each of the candidate rules is disjoint.

5. The method of claim 1, wherein the value density for each of the plurality of rules is calculated for historical transactional data.

6. The method of claim 5, wherein the selection of the set of rules is constrained by a plurality of constraints.

7. The method of claim 6, wherein the plurality of constraints comprise a maximum number of events to be triggered by the rule set.

8. The method of claim 1, wherein the plurality of candidate rules includes a rule corresponding to a Falcon score.

9. The method of claim 1, wherein the value density for each of the plurality of rules is an average amount of money saved by each specific rule averaged among a total number of transactions flagged by the specific rule.

10. The method of claim 1, wherein the provided sub-set of rules includes a selection of rules from the plurality of candidate rules that are estimated to provide the greatest savings when applied to the one or more financial transactions.

11. The method of claim 1, wherein the plurality of candidate rules are configured so that each of the one or more financial transactions is flagged by only one of the plurality candidate rules.

12. A computer-readable medium having stored thereon instructions, that when executed by one or more processors, perform actions comprising:
    obtaining a plurality of candidate rules for referrals of financial transactions;
    electronically determining value densities that correspond to per account savings levels associated with applying the candidate rules to financial transactions;
    electronically selecting a rule from the plurality of candidate rules based on the determined value densities;
    iteratively rebalancing value densities for the remaining rules of the plurality of candidate rules and selecting a next rule with the processor until a volume constraint is satisfied, to obtain a sub-set of rules from the plurality of candidate rules for application to one or more financial transactions, wherein the rebalanced value density for at least one of the remaining rules is different than the initial value density for the at least one of the remaining rules.

13. The method of claim 12, wherein the value density for each of the plurality of rules is an average amount of money saved by each specific rule averaged among a total number of transactions flagged by the specific rule.

14. The method of claim 12, wherein the provided sub-set of rules includes a selection of rules from the plurality of candidate rules that are estimated to provide the greatest savings when applied to the one or more financial transactions.

15. The method of claim 12, wherein the plurality of candidate rules are configured so that each of the one or more financial transactions is flagged by only one of the plurality candidate rules.

* * * * *